US008805711B2

(12) United States Patent
Dantzig et al.

(10) Patent No.: US 8,805,711 B2
(45) Date of Patent: Aug. 12, 2014

(54) TWO-LAYER DATA ARCHITECTURE FOR RESERVATION MANAGEMENT SYSTEMS

(75) Inventors: Paul M. Dantzig, Scarsdale, NY (US); Sastry S. Duri, Yorktown Heights, NY (US); Arun Iyengar, Yorktown Heights, NY (US); Francis Parr, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/644,875

(22) Filed: Dec. 22, 2009

(65) Prior Publication Data

US 2011/0153373 A1  Jun. 23, 2011

(51) Int. Cl.
*G06Q 10/00* (2012.01)

(52) U.S. Cl.
USPC .......................................................... 705/5

(58) Field of Classification Search
USPC .............................................................. 705/5
See application file for complete search history.

(56) References Cited

U.S. PATENT DOCUMENTS

| | | | |
|---|---|---|---|
| 6,085,169 A * | 7/2000 | Walker et al. ...................... 705/4 |
| 6,122,642 A | 9/2000 | Mehovic | |
| 6,505,162 B1 * | 1/2003 | Wang et al. .................... 704/275 |
| 6,516,350 B1 | 2/2003 | Lumelsky et al. | |
| 7,035,859 B2 | 4/2006 | Fitzpatrick et al. | |
| 7,035,931 B1 * | 4/2006 | Zayas et al. .................... 709/229 |
| 7,257,587 B2 | 8/2007 | Fitzpatrick et al. | |
| 2002/0016935 A1 * | 2/2002 | Bergsten et al. ................. 714/20 |
| 2002/0049535 A1 * | 4/2002 | Rigo et al. ...................... 701/211 |
| 2002/0156659 A1 * | 10/2002 | Walker et al. ...................... 705/5 |
| 2002/0156684 A1 * | 10/2002 | Stone et al. ...................... 705/22 |
| 2003/0009477 A1 * | 1/2003 | Wilding et al. ............. 707/104.1 |
| 2004/0225673 A1 * | 11/2004 | Beck et al. ...................... 707/102 |
| 2005/0192994 A1 * | 9/2005 | Caldwell et al. .............. 707/101 |
| 2007/0185923 A1 * | 8/2007 | Nishikawa et al. ............ 707/202 |
| 2007/0271123 A1 * | 11/2007 | Miyashita ........................... 705/5 |
| 2008/0034251 A1 * | 2/2008 | Singhal et al. ..................... 714/5 |
| 2009/0030956 A1 * | 1/2009 | Zhang et al. ................... 707/205 |
| 2009/0063667 A1 * | 3/2009 | Smith et al. .................... 709/222 |
| 2009/0313212 A1 * | 12/2009 | Aust ................................. 707/2 |

OTHER PUBLICATIONS

Jacso, Peter, "Have Database, Will Travel—Part 1: Online Travel Databases," Database, Aug. 1995, 18, 4, p. 14.*
C. Liebig and M. Cilia and M. Betz and A. Buchmann, A Publish/Subscribe CORBA Persistent State Service Prototype, 2000, Springer-Verlag, Berlin, Heidelberg.

(Continued)

*Primary Examiner* — Nathan Erb
(74) *Attorney, Agent, or Firm* — Thomas Grzesik; Fleit Gibbons Gutman Bongini & Bianco PL

(57) ABSTRACT

A reservation management system includes at least one processing node that includes a memory and a processor. The at least one processing node further includes a set of reservation processing and transaction modules that manage and process reservation requests and inquiries. At least one general purpose database is communicatively coupled to the at least one processing node. The at least one general purpose database includes a set of pre-allocated tables of fixed length records. At least one persistent storage device is communicatively coupled to the at least one processing node. The general purpose database persistently stores the set of pre-allocated tables of fixed length records on the at least one persistent storage device.

24 Claims, 9 Drawing Sheets

(56) References Cited

OTHER PUBLICATIONS

Anat Eyal and Tova Milo, Integrating and Customizing Heterogeneous E-commerce Applications, 2001, Springer-Verlag, Tel Aviv, Israel.

Andrew Mutz and Rich Wolski and John Brevik, Eliciting Honest Value Information in a Batch-Queue Environment, Proceedings of $8^{th}$ IEEE/ACM International Conference on Grig Computing, 2007, IEEE, Santa Barbara, California.

* cited by examiner

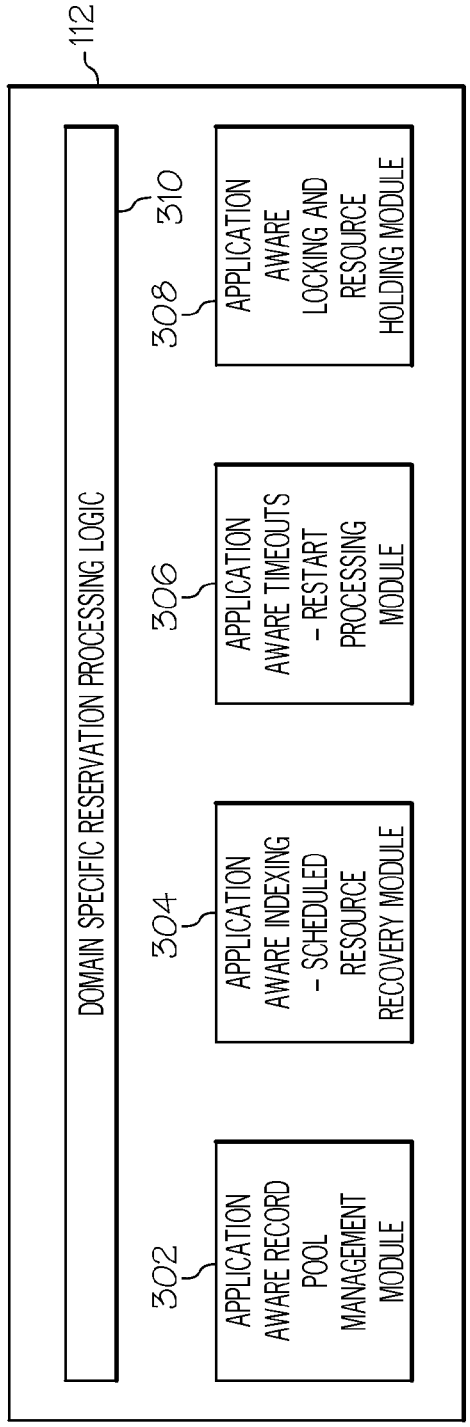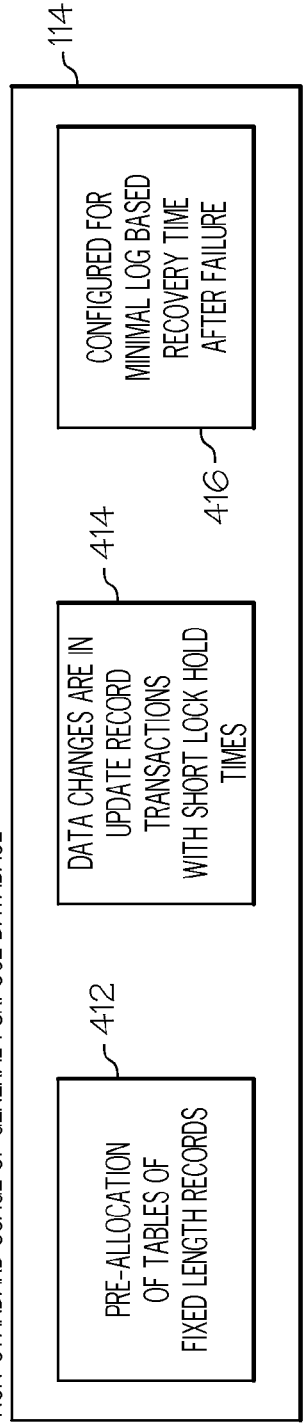

TWO-LAYER DATA ARCHITECTURE FOR RESERVATION MANAGEMENT SYSTEMS

FIELD OF THE INVENTION

The present invention generally relates to managing data, and more particularly relates to reservation management systems.

BACKGROUND OF THE INVENTION

Reservation management systems manage large amounts of data. Unfortunately most conventional reservation management systems do not efficiently provide continuous availability of managing of reservations in a high performance environment with a low total lifetime cost of ownership. For example, in the domain of airline reservations, terabytes of persistent data storage may be needed to store all active passenger reservations. During critical times of a day/year and in cases where flight schedules have been disrupted by various factors such as inclement weather, there may be demand from thousands of passengers to retrieve and modify their reservations. The effect of an outage of the reservation system at any time causes significant inconvenience to passengers and to airline operations. Existing reservation management systems do not efficiently provide a continuously available system to safeguard against outages and other system failures and with data saved persistently using general purpose data base technology.

SUMMARY OF THE INVENTION

In one embodiment, a reservation management information processing system is disclosed. The reservation management information processing system comprises at least one processing node. The at least one processing node comprises a memory and a processor. The at least one processing node further comprises a set of reservation processing and transaction modules that manage and process reservation requests and inquiries. At least one general purpose database is communicatively coupled to the at least one processing node. The at least one general purpose database comprises a set of pre-allocated tables of fixed length records. At least one persistent storage device is communicatively coupled to the at least one processing node. The general purpose database persistently stores the set of pre-allocated tables of fixed length records on the at least one persistent storage device.

In another embodiment, a computer implemented method for continuously and persistently managing a reservation system is disclosed. The computer implemented comprises pre-allocating, by a general database, a set of tables of fixed length records. The set of tables are pre-allocated prior to being populated. At least a first table in the set of pre-allocated tables is designated to store information on the state of the user reservation dialog including user identification information. At least a second table in the set of pre-allocated tables is designated to store inventory information. A reservation processing module that is independent from the general database receives a request from a user for a reservation. A set of information associated with the user reservation dialog is stored in at least a first record in the first table as an update to the first table by the reservation processing module. The reservation processing module managed the request from the user based on a set of reservation state information within the set of tables comprising at least inventory information in the second table.

In yet another embodiment, a computer implemented method for continuously and persistently managing a reservation system is disclosed. The computer implemented method comprises pre-allocating, by a general database, one or more sets of uniquely identified fixed size record. A reservation processing module that is independent from the general database manages the one or more sets of uniquely identified fixed size records. The reservation processing module receives a request from a user for a reservation. The reservation processing module updates at least a first record in the one or more sets of uniquely identified fixed size records with a set of user reservation dialog information associated with that reservation dialog. The set of user reservation dialog information comprises at least user identification information and a set of inventory resources requested by the user via a request of the reservation dialog. A first record is persistently stored by the reservation processing module on at least one persistent storage device at one or more given intervals of time. The at least a second record in the one or more uniquely identified fixed size records is updated by the reservation processing module with a set of reservation information reflecting change in the inventory available to subsequent requests from other user reservation dialogs. The second record is persistently stored by the reservation processing module on at least one persistent storage device at one or more given intervals of time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 is a block diagram illustrating a first layer of a reservation management system according to one embodiment of the present invention;

FIG. 4 is a block diagram illustrating a second layer of a reservation management system according to one embodiment of the present invention;

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
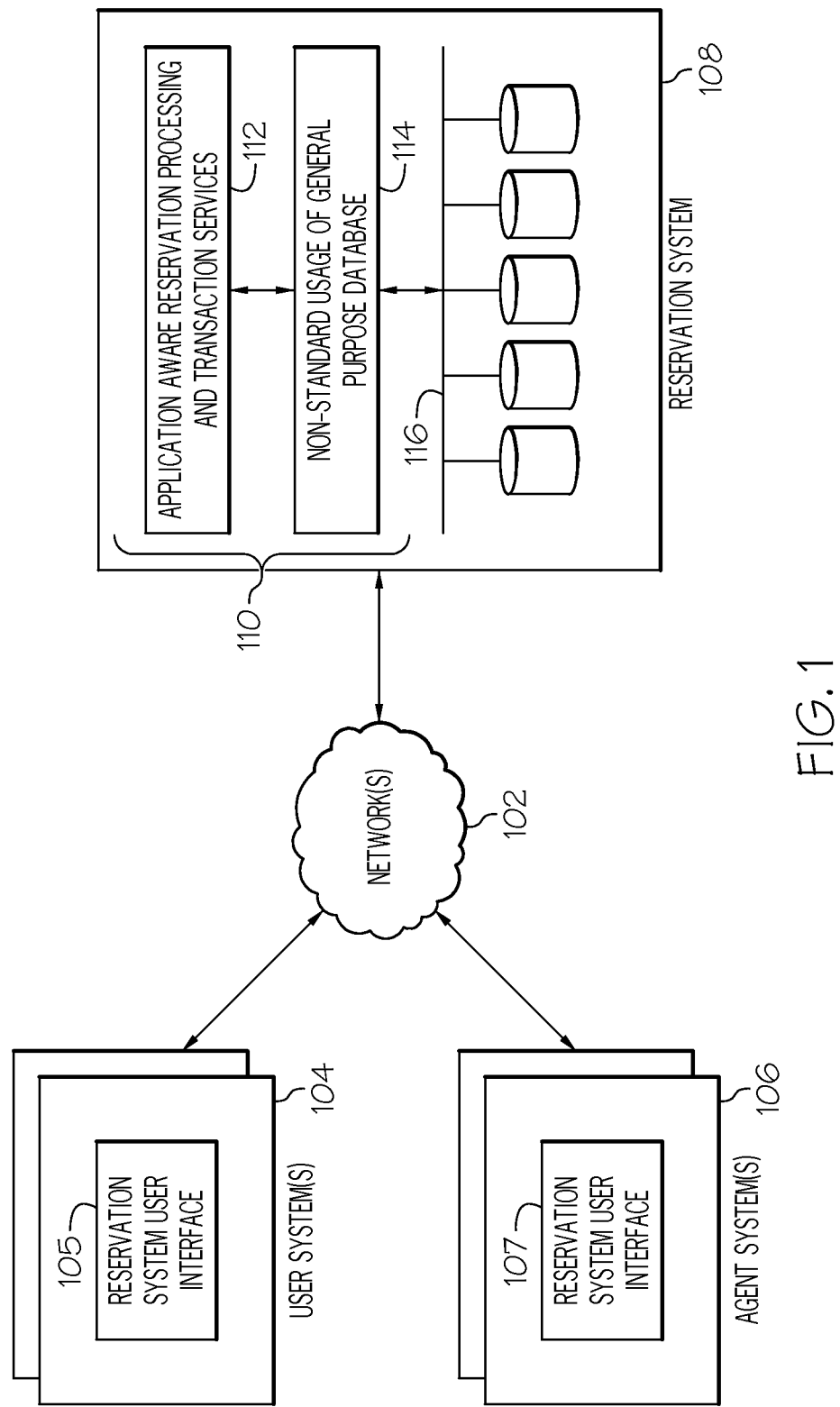
FIG. 1 is a block diagram illustrating one example of an operating environment according to one embodiment of the present invention.

According to one embodiment, FIG. 1 illustrates one example of an operating environment/system for a reservation management system comprising a two-layer data and software architecture. The reservation management system of various embodiments of the present invention provides improved performance, availability, and ease of customization over conventional reservation systems.

FIG. 1 shows one or more networks 102 that, in one embodiment, are wide area networks, local area networks, wired networks, wireless networks, and/or the like. In one embodiment, one or more client information processing systems 104, 106 are communicatively coupled to the network(s) 102. In one embodiment the client information processing systems 104, 106 can comprise a reservation system user interface 105, 107 where a user can make a reservation and/or an agent can make a reservation on behalf of a user.

The one or more networks 102 communicatively couple the client system(s) 104, 106 to one or more reservation management systems 108. The reservation management system 108 allows one or more users and/or agents to obtain information related to potential or scheduled reservations, make reservations, manage existing reservations, and the like. Agents are typically skilled users of the reservation system in telephone or face-to-face contact with an end user and issuing requests to address the user's needs. Airline agents, travel agents and airport control agents are typical examples. Other users may be able to connect directly to the reservation system 108 over the network 102 as well. It should be noted that the following discussion uses an airline reservation system as one type of reservation system applicable to the present invention. However, the reservation management system 108 of one or more embodiments of the present invention is applicable to any reservation context such as accommodation reservations (hotel, timeshare, weekend rentals, etc.), transportation reservations (e.g., bus, train, boat, automobile, etc.), entertainment reservations (e.g., movies, concerts, etc.), and the like.

The reservation management system 108, according to one embodiment, comprises a two-layer software and data architecture 110. This two-layer architecture 110 comprises an upper layer 112 of application aware reservation processing and transaction services and a lower layer or database 114 comprising a general purpose database(s) 214 such as, but not limited to, a relational database. In one embodiment, the lower layer 114 utilizes the general purpose database in a non-standard way, as discussed in greater detail below. A set of persistent storage devices 116 is communicatively coupled to the lower layer 114 for persistently storing reservation related information, as is discussed in greater detail below. Persistence plays a critical role in the design of scalable reservation systems because reservations once made must never be lost and always be available for reading, processing, or changing. The set of persistent storage devices 116 are generally, but not limited to, magnetic disks and are used for the storage of both data and recovery logs. The two-layer architecture 110 and the set of persistent storage devices 116 can reside at a single information processing system or can be distributed across multiple information processing systems/nodes.

In particular, the reservation management system 108 performs various reservation related services. Users and agents are connected to the reservation management system 108 and are able to interact with the system 108 via a reservation management system user interface 105, 107 residing at the client systems 104, 106. The reservation management system user interface 105, 107 can be comprised of a local application(s), a web application(s), a mash-up, or the like.

The lower level 114 of the software and data architecture, in one embodiment, is a general purpose scalable database deployable on a general purpose operating system. In this embodiment, the general purpose scalable database is a relational database. The general purpose scalable database is used to manage the writing of data to the set of persistent storage devices 116 and also to manage the large number of storage devices. This provides significant cost saving, scalability, reliability, and functional benefits. Examples of capabilities provided by using a general purpose infrastructure in the reservation management system 108 comprise large data set management; reliable—dual write or RAID disk write capabilities; disk drivers and data management utilities; short term fine grained locking; group commit for high rates of update transactions; and log based recovery after failure.

One advantage of various embodiments of the present invention is that the reservation system processing is organized into various layers that allows the reservation system to be scalable and efficient. Also, the reservation system of various embodiments of the present invention comprises enhanced data accessibility and cost/resiliency characteristics by utilizing general purpose operating systems with a general purpose database(s) to manage the handling of data and persistent storage devices.

Figure 2:
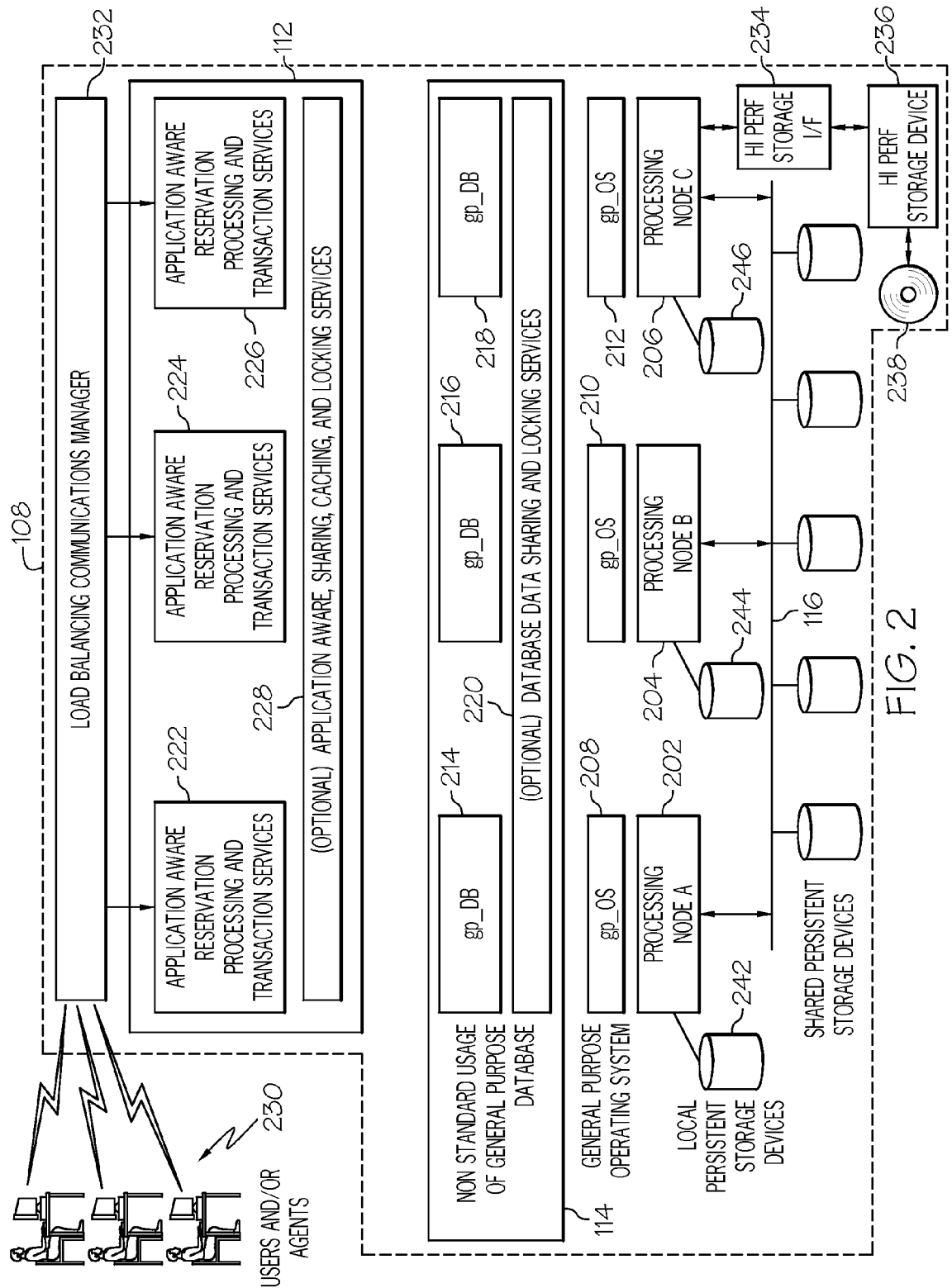
FIG. 2 is a block diagram illustrating another example of an operating environment according to one embodiment of the present invention.

FIG. 2 shows another embodiment of an operating environment. FIG. 2 shows the reservation management system 108 within a clustered environment that provides additional scalability while preserving the two layer structure discussed above with respect to FIG. 1, and discussed in greater detail below. In particular, FIG. 2 shows a cluster of three processing nodes: processing node A 202, processing node B 204, and processing node C 206. It should be noted that one or more embodiments can comprise clusters of any size. The clustered environment can comprise shared persistent storage devices 116 accessible to all processing nodes in the cluster. Also, persistent storage devices can be attached to individual nodes 202, 204, 206 in the cluster as shown by devices 242, 244, 246.

Each of the processing nodes 202, 204, 206, in one embodiment, runs a general purpose operating system 208, 210, 212 enabling the execution of a variety of application software. General purpose database software 214, 216, 218 executes on each of the processing nodes 202, 204, 206 supported by the general purpose operating system 208, 210, 212 on the node.

Optional services 220 that allow the database software instances on the cluster nodes to provide a common data sharing and locking service can also be included. The general purpose databases 214, 216, 218, and the optional services 220, in one embodiment, comprise the lower layer 114 within each of the processing nodes 202, 204, 206, as has been discussed above with respect to FIG. 1.

FIG. 2 also shows the upper layer 112 of the reservation management system 108 as well. In particular, FIG. 2 shows the application aware reservation processing and transaction services instances 222, 224, 226, in this example, as executing on each of the processing nodes 202, 204, 206 and using the underlying database services. In addition, in a cluster environment there can be, in one or more embodiments, coordination application aware services 228 such as application aware sharing, caching, and locking services in the cluster as well.

Customers and agents 230 are shown connecting to the cluster reservation system 108. In the cluster example, according to one embodiment, a load balancing communications manager 232 receives requests from customers and agents 230. The communications manager 232 distributes the requests to the application aware reservation processing instances 222, 224, 226 on different nodes 202, 204, 206 of the cluster in such a way as to balance load while maintaining any affinity relationships between particular customer reservation dialogs and particular nodes at which those reservation dialog have started.

In one embodiment, the persistent storage devices 116, 242, 244, 246 comprise magnetic disks managed by a file system which is part of the general purpose operating system instances 208, 210, 212 on each processing node 202, 204, 206. In another embodiment, magnetic persistent storage devices are communicative coupled to the processing nodes 202, 204, 206 via a storage area network as shown by the devices 116 and hence sharable and accessible to all the processing nodes. In addition to using conventional rotating magnetic storage (hard drives) for persistent storage, an alternative embodiment can use shared or locally attached high performance storage systems such as solid state drives, caching magnetic disk controllers with duplexed buffering, and early release or solid state memories as shown by high performance storage interface 234, high performance storage device 236, and high performance storage medium 238. The high performance storage devices could be locally attached to individual processing nodes or shared. Other types of persistent storage devices could also be used within the spirit and scope of this invention.

Two-layer Software and Data Architecture For Reservation Systems

FIGS. 3 and 4 show a more detailed view of the upper layer 112 and lower layer 114, respectively, of the reservation management system 108. In particular, the upper layer 112 comprises an application aware record pool management module 302, an application aware indexing and resource recovery module 304, an application aware timeout and restart processing module 306, an application level locking and a resource holding module 308, and a domain specific reservation processing module(s) 310. It should be noted that the application level locking and resource holding module 308 is also referred to as the functional responsibility 308 of the upper layer 112. The lower layer 114 comprises a non-standard and novel use of a general purpose database. In particular, the lower layer 114 comprises pre-allocation of tables of fixed length records 412, data changes in update record transactions with short hold times 414, and a database configuration for minimal log based recovery time after failure 416. It should be noted that the data changes in update record transactions with short hold times 414 is also referred to as the functional responsibility 414 of the lower layer 114.

With respect to the pre-allocation of tables of fixed length records 412, the database layer 114 is responsible for creating large tables of records for each of the major persistent data required by the reservation processing module 310 of the upper layer 112. These files are pre-allocated in the sense that new records are created in the table only as the total table size available for use by active records changes or as persistent storage devices are added to or removed from the database configuration.

The application aware record pool management module 302 in the upper layer 112 tracks when particular records in a record pool become active and in use. For example, when a new reservation is created the application aware pool management module 302 allocates a pool record for the reservation and marks this record as active. The underlying database 214, 216, 218 detects an update of a previously created record in the persistent file with the data capturing the information in the new reservation. However, the database sees this as an update of an existing record and not a creation of a new row in a table. Also, in one embodiment, the database does not understand individual fields in the record updates that it is asked to apply since, for example, the detailed field structure in an airline reservation record may need to be different in reservations made for different airlines.

The application aware and indexing and resource recovery module 304 in the upper layer 112 builds a number of indexes designed to meet the specific requirements of reservation record retrieval. Having indexes is expensive for sets of records with high update rates and slows the system down. Therefore, in one embodiment, the number of indexes created is very small and these critical application aware indexes are built so as to minimize this cost. The application aware and indexing and resource recovery module 304 is also responsible for periodically scanning these indexes and recovering lost or misplaced resources. Processing system failures, user errors, and reservation application logic errors can cause these problems. Periodic scans of the indexes by this module 304 are used to keep the system running continuously by detecting anomalies and recovering from them.

The data changes in update record transactions with short hold times 414 in the lower layer 114 are predominantly record updates to existing records in very short transactions with short lock hold times. It should be noted that although relational database terminology is used throughout this discussion similar concepts exist in other general purpose database systems applicable to various embodiments of the present invention. The standard use of relational tables has new records or rows created in tables with some form of SQL INSERT statement and removed from tables with some form of SQL DELETE statement. However, in one or more embodiments of the present invention, the database does not directly see events such as, but not limited to, a new reservation being created as a new database record creation. Instead, these events are handled in the upper layer 112 and reflected to the database layer 114 as SQL UPDATE operations to get the necessary information persisted. The database 214 does see SQL INSERT and SQL DELETE statements only when a file is created for the first time and made available to record pool management module 302 in the upper layer 112 or when the space available for record pool management changes.

The SQL UPDATE statements seen in the database layer 114 as part of the database layer functional responsibility (e.g., data changes 414) are also in simple transactions with short lock hold times. This is because scalable database implementations are designed to work and allocate its internal resources around having a limited number of connections for application using the database to connect on. In the reservation environment there can be a very large number of users and agents competing to process their reservation requests concurrently. Scalability and stability of the reservation system by making efficient use of a limited number of connections into the database is achieved by ensuring that the interactions between the upper (reservation) layer 112 and lower (database) layer 114 take the form of very simple short transactions with short lock hold times.

The application aware locking and resource holding module 308 in the upper layer 112 ensures that interactions with the lower database layer 114 have the required property of being simple updates or read and update interactions with short lock holds. This module 308 allows the reservation process application 310 to know and enforce that for certain pool records only a single user or agent can have access at a time. This can be used to simplify the update interactions with the underlying database by not depending on database locks. There may also be "conservation" rules on resources that are managed by the reservation processing module 310. Specifically seats on a flight are "moved" from the available inventory into reservation records without getting lost on the way. Database locking and data integrity mechanisms cannot be used to implement this form of resource conservation since lock and transaction lifetime in the database need to be limited to 10's milliseconds while reservation system users may take minutes gathering information about possible itineraries and making up their mind whether to book something. Therefore, the upper (reservation processing) layer 112 via the functional responsibility 308 provides application aware transaction services to allow resources to be held for periods of time in a transitional state and logic to ensure that these resources are preserved or recovered in all processor failure of user or application error situations.

The underlying lower level database 114, in one embodiment, is configured to minimize log based recovery time and restart time after a failure. In more standard usages of databases, tradeoffs are made to allow accelerated performance when database updates are involved at the expense of additional log process to get database data back into a consistent state after a failure. In a reservation context, where continuous operation is a requirement, a different and non-standard configuration of the underlying database is required, as provided by one or more embodiments of the present invention. The log processing phase of restart is reduced to a minimum. Write out of updated pages from the database buffer to stable storage or to persistent devices 116 is made to occur as quickly as possible so that the reservation system can resume processing immediately after a failure using essentially the data on persistent devices. The simple transactions and short lock hold times 414 specified in the lower layer contribute towards achieving this goal. Additional settings of the database can maximize write out activity for pages updated in the database buffer pool.

The application aware timeout and restart processing module 306 is used in the upper layer 112 to further improve continuous operation and rapid restart time after a failure of the reservation system or of one of its components. A discipline is enforced on the reservation processing module 310 so that all complex operations have a timeout and recovery processing in the event of a defined timeout having occurred. This helps ensure that key parts of the reservation system keep operating even in the face of processor failures or extreme reservation system overload. There is also application aware logic to handle restart after a failure of the system or of an individual component so that a level of normal request processing continues without interruption of a majority of the current user reservation dialogs between users/agents and the system while making a failure transparent to end users/agents.

The upper layer transaction services/modules 302, 304, 306, 308 are useful in all reservation domains. The domain specific reservation processing module 310 uses these general services/modules. As stated above, the reservation processing can include processing associated with airline, train, hotel, or other reservation domains.

Figure 5:
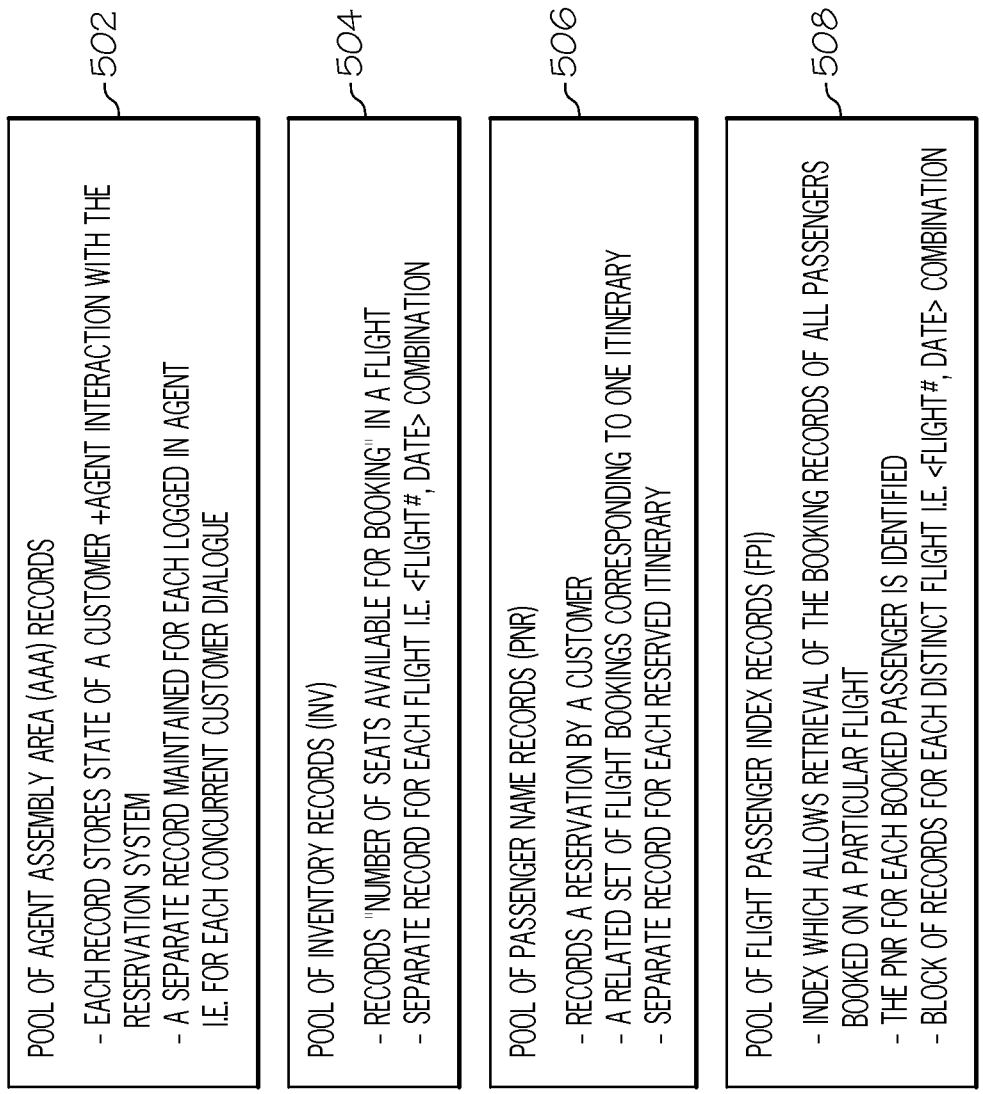
FIG. 5 is a block diagram illustrating various record pools associated with a reservation management system according to one embodiment of the present invention.

FIG. 5 illustrates various persistent data record pools applicable to the reservation management system 108. It should be noted that although FIG. 5 shows persistent data record pools associated with an airline reservation system, record pools associated with other reservation systems are also applicable as well. The following pools of records, in one embodiment, are managed by the application aware reservation processing layer (e.g., the upper layer) 112, Application Assembly Area record pool (AAA) 502, Inventory Record Pool (INV) 504, Passenger Name Record pool (PNR) 506, and Flight Passenger Index record pool (FPI) 508.

Each AAA record 502 stores the current state of a customer reservation dialog with the reservation system 108. If there is an agent involved the agent, in one embodiment, will have logged in to the system 108 and been assigned an available AAA record for the reservation dialog currently being handled. Passenger identification information and seats on hold available for booking by this customer is stored in the AAA or held in temporary records coupled to the AAA record. Each AAA record is accessible to only one user conversation at a time. Therefore, there is an opportunity for application level "locking" of the AAA. When a customer ends a reservation dialog, some resources held in the AAA may be moved to a PNR 506 as part of a permanent reservation record for that customer. Unused resources in the AAA are returned to their owning INV record making them available for other customers. The AAA contents are made persistent on each pause for customer agent interaction so that the progress of the reservation dialog is not lost if there is a processor or system failure.

Each INV record 504 stores inventory i.e. in an airline reservation context such as the number of seats currently available to be handed out to reservation requesting customers on a particular flight. A flight is identified by the operating airline where the flight number identifies the starting point, ending points, schedule, date of operation of the flight, and the like. Typically there are multiple fare classes (e.g. business, economy, first, etc.) so availability is stored as a set of numbers, one for each fare class. An inventory pool record 504 is allocated and initialized when reservations for that day's flight become available on the system, which is typically about a year before the day of operation. The INV record 504 is initialized with availability, which reflects the capacity of the aircraft being used. The INV record 504 is maintained with inventory being removed from the record 504 (or returned to the record 504 as a result of cancellations or decisions "not to reserve") until some number of days after the flight has been operated. For popular INV records 504 there can be high contention to access them from many users attempting to reserve that resource concurrently. INV records 504 are written to stable storage 116 whenever they are updated to avoid risk of losing the fact that seats have been made available to reservation dialogs.

Each PNR record 506 stores a reserved itinerary or set of resources on behalf of a particular user. An airline PNR 506 can include multiple connecting flight legs and multistep or return journey. A PNR 506 can describe the reservations for a group travelling together. PNRs 506 are created when an itinerary is first reserved. A PNR record 506 can be changed multiple times to accommodate changing travel plans or additional itinerary legs. A PNR 506 is written to persistent or stable storage 116 as soon as it is created to ensure that passenger reservations are not lost. A PNR record 506 is used to manage ticket payment, set assignment, and airport control processing (check in and boarding pass issuance). A PNR pool record 506 can be deallocated and removed from the on-line reservation system some safe interval after the itinerary has been completed.

In order to retrieve reservation records using the name of the passenger and the flight on which they are booked and to generate a list of all the reservations made so far for a given flight, an index 508 is built via the application aware indexing and resource management module 304. The compound key sequence for this index 508, in one non-limiting example, is Airline, flight number, day, name of traveler. Each index block comprises records with key sequences followed by the PNR record keys of the reservations made on the flight. Reservations are indexed when they are made and the PNR is created. FPI index records 508 can be deleted when reservations have been used or cancelled and are being archived and removed from the on-line system.

In addition to using the FPI index record 508 to locate reservations and provide a flight passenger list, indexes like FPI are also used for application aware resource recovery. Inventory (seats) can get "lost" for many reasons, including system or processor failure while transferring inventory from INV records to AAA record to PNR record and application error failing to return unused seats from an AAA 502 to INV 504.

Even if there is a policy of "overbooking" and selling more inventory than is strictly available to account for passenger "no shows", it is critically important for business profitability and good management that overbooking strategies are based on accurate estimates of the oversell rate. Inventory loss is mitigated by performing periodic scans of the FPI index 508, totaling the number of sold reservations, adding in the current INV free seat counts, and prompting a business decision of whether free inventory should be added to compensate for possible inventory loss. In this way, resource integrity (seat loss) can be avoided or mitigated with an amount of overhead processing which reflects the current need for accuracy. Typically, an undersold flight needs less inventory checking while a flight that is almost fully booked or is about to depart needs a more accurate inventory.

Figure 6:
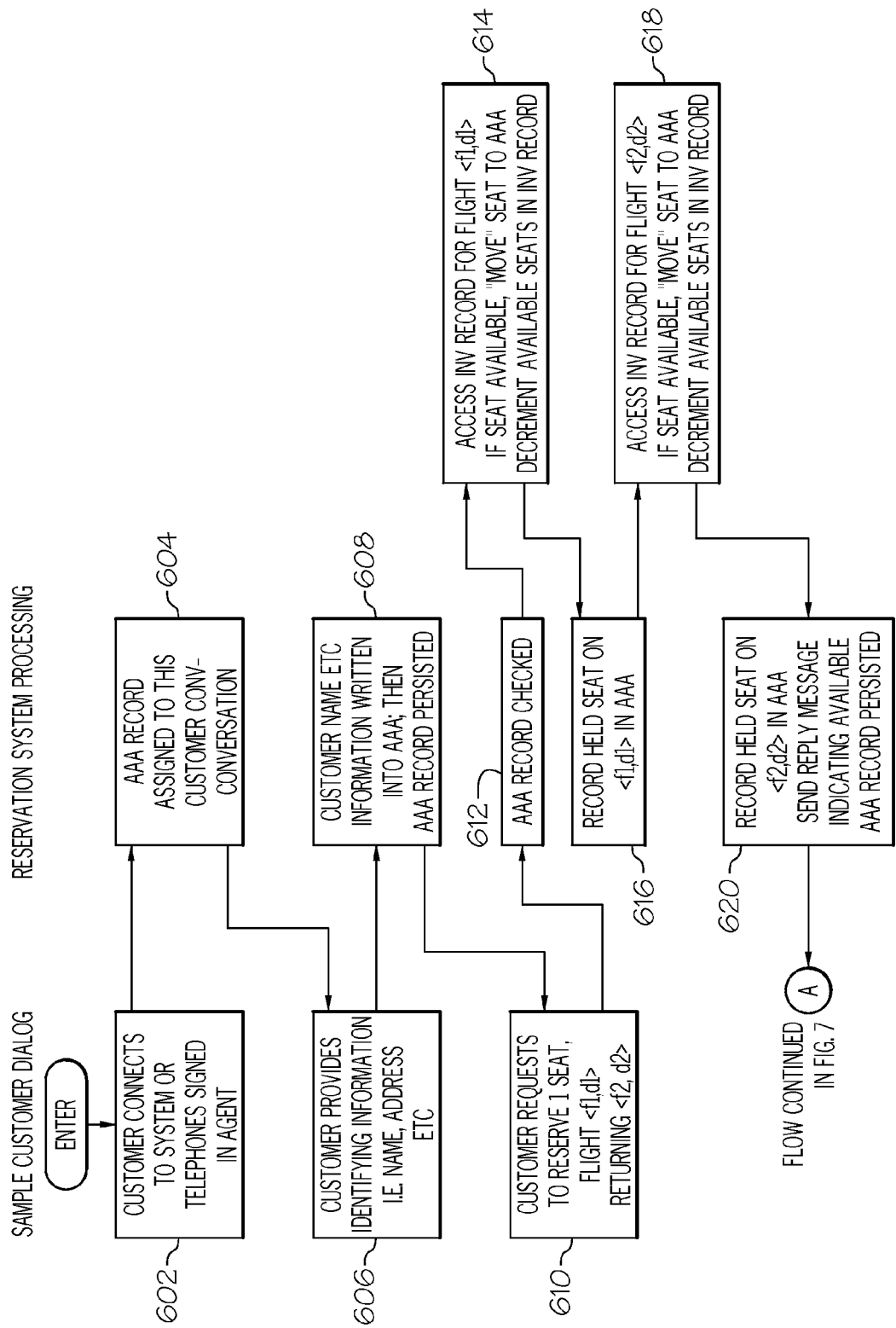
FIGS. 6-7 are sequence flow diagrams illustrating one example of a user reservation dialog with a reservation management system according to one embodiment of the present invention.
Figure 7:
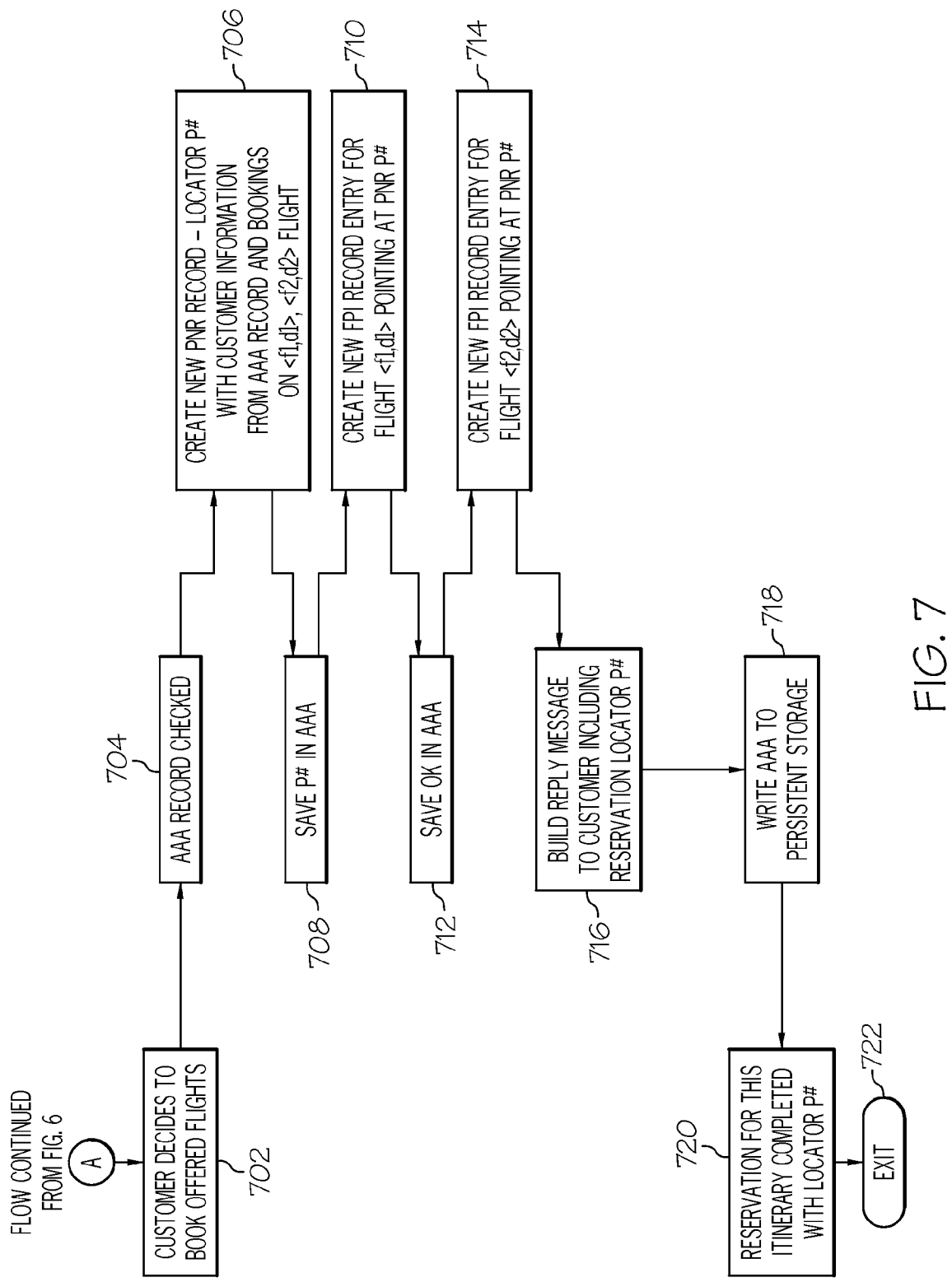

FIGS. 6 and 7 are sequence flow diagrams illustrating one example of a sequence of actions in a simple user reservation dialog. The leftmost column shows the interactions between the reservation system and the end customer while the columns to the right show processing steps in the reservation system in response to this dialog. A customer or agent, at step 602, establishes contact with the reservation system 108. This causes an AAA record 502, at step 604, to be assigned for managing this customer reservation dialog with the reservation system 108. The customer (or agent acting on his/her behalf), at step 606, enters customer identification information, e.g. name, address, and contact phone number in element.

The reservation system 108, at step 608, saves the contact information in the AAA record 502 then writes that record to persistent storage 116. The customer, at step 610, requests a reservation for one passenger travelling out on flight f1 on day d1 and returning on flight f2 on day d2. The AAA record 502, at step 612, is checked to ensure that it comprises enough customer identification and other content to request seats to be held. The INV record 504, at step 614, is analyzed (via the application aware locking and resource holding module 308) for the outgoing flight <f1,d1> to see if a seat is available. Assuming that the seat is available, the available seat count in that INV record 504, at step 616, is decremented by 1 and the seat is moved and marked as temporarily saved in the AAA record 502 in element. A second request for inventory, at step 618, is processed (via the application aware locking and resource holding module 308) for the return flight f2 on day d2. Assuming that both requests succeeded then the AAA record 502, at step 620, is marked to hold the two reserved seats and a reply is sent to the customer or agent allowing a final decision whether to make the requested reservation or return it and the AAA is again written to persistent storage 116 saving the state (with its temporary content of two seat reservations). The flow then continues to FIG. 7.

The customer, at step 702, decides to make the reservation presented as an available option at step 622 of FIG. 6. The AAA record 502, at step 704, is analyzed to ensure that resources requested are indeed available in the AAA record 502. A new reservation record, a PNR record 506, at step 706, is written (via the application aware locking and resource holding module 308) with this information. The new PNR record 506 is assumed to have locator or key p# in the PNR record pool. The AAA record 502, at step 708, is updated to record successful PNR generation and to make the request to update the FPI flight passenger index with a reference to flight out reservation <f1,d1>. The FPI index entry 508 for <f1,d1>, at step 710, is updated (via the application aware indexing and resource management module 304) with a key value corresponding to <f1, d1> and the reservation record identified with its key or locator in the PNR table p#. The control flows back to the AAA record 502, at step 712, where the outgoing flight indexing operation is marked OK and the return flight indexing operation is initiated.

The return flight reservation, at step 714, is indexed (via the application aware indexing and resource management module 304) with information analogous to that in step 710. The control flows back to the AAA record 502, at step 716, where it is recorded that the reservation is successfully made and indexed and a reply message for the agent or customer is built and sent. The AAA record 502, at step 718, is again written to persistent storage 116 at this point to save knowledge that the reservation was made successfully. The customer, at step 720, receives confirmation that the reservation was successfully made including its record locator information p#. The flow then exits at step 722. It should be noted that the sample reservation flow discussed with respect to FIGS. 6 to 7 was only used to show one simplified example and various embodiments of the present invention are applicable to a wide range of similar and related customer reservation dialog flows in reservation systems.

Figure 8:
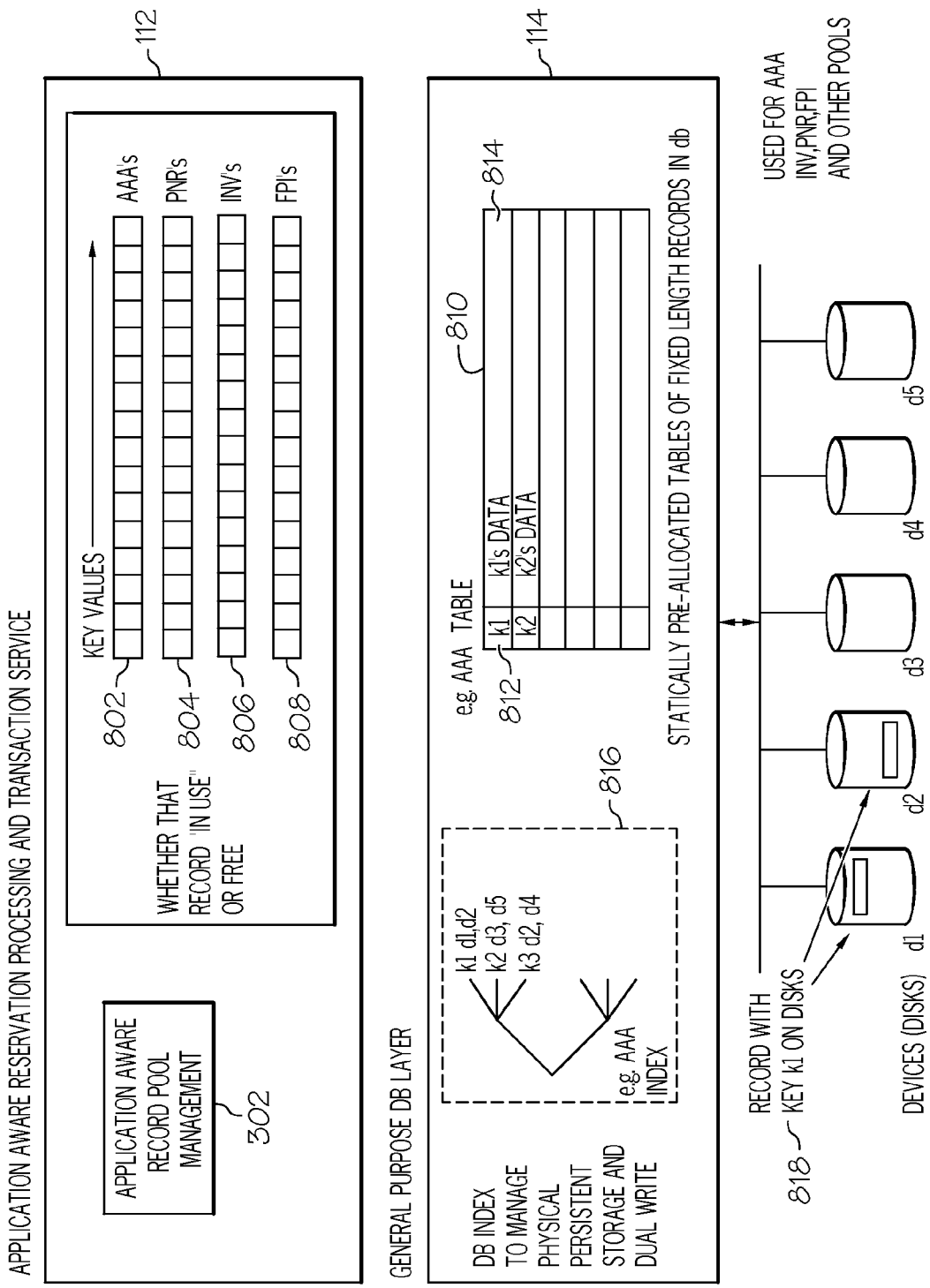
FIG. 8 illustrates one example of how the management of pool records is divided between the first layer of FIG. 3 and the second layer of FIG. 4 of the reservation management system according to one embodiment of the present invention.

FIG. 8 illustrates one example of how the management of pool records can be divided between the upper and lower layers 112, 114 of the reservation management system 108. FIG. 8 shows a more detailed view of the record pool management module 302. As shown above, the pools of AAA, PNR, INV, and FPI records 502, 504, 506, 508 need to be managed. Therefore, the record pool management module 302 maintains a data structure 802, 804, 806, 808 for each pool record 502, 504, 506, 508. The data structure 802, 804, 806, 808, shows for an associated record key value whether that record is currently in use as an active record in its pool or alternatively whether that record is currently a "free" record available for allocation and use.

With respect to the general purpose database configuration of the lower layer 114, a pre-allocated table of fixed length records 810 stored in the database. Each record in this table has a key 812 uniquely identifying the record and a record body 814. Keys k1 and k2 are shown as the key values for the first two records in the table. All records in this table have the same fixed length. Therefore, operations in the database to store the contents of a pool record persistently always take the form of an update in place operation on the record body rather than a length changing operation or a record insert or delete. Allocation of a record in the pool is managed by the upper layer 112 while writing records to persistent storage is managed by the lower layer. As an example, FIG. 8 represents the table underlying a single pool for the AAA record pool. For each record pool there is a separate underlying pre-allocated table in the database providing persistence. Thus, with an example structure of AAA, INV, PNR, and FPI pools in the sample application there are four underlying pre-allocated tables in the database. It is also possible to have different pools share a same table, or a single pool to spread across multiple tables.

FIG. 8 also shows one of the services 816 provided by the general purpose database to support these persistent pre-allocated tables. For example FIG. 8 shows an indexing structure 816 provided by the general purpose database. For each key value this index indicates where on the persistent storage devices 116 the record with that key value is stored persistently. For high reliability and survival of data across failure of any single physical storage device each record, in one embodiment, is stored on a least two independent devices. However, other configurations are applicable as well.

As an example, the index 816 shown in FIG. 8 has record with key k1 stored at some known offset on device d1 and at some known (potentially different) offset on device d2. FIG. 8 also shows the persistent device locations 818 for the record with key k1 in the pre-allocated table in this example underlying the AAA record pool. With the indexing structure of this example the general purpose database is able to write out and retrieve the record of the pre-allocated tables to persistent storage with efficiency and reliability.

One advantage of one or more embodiments of the present invention is that pre-allocated tables are used within the Database Management System (DBMS) for storing data related to reservations. Therefore, one or more embodiments are able to take advantage of the variety of features that relational DBMS possess while improving performance. Conventional reservation systems generally do not use pre-allocated tables in combination with a relational DBMS. As a result, when new data needs to be added to tables, the tables must be augmented in size. This results in overhead for each insertion into a database table. By contrast, one or more embodiments of the present invention pre-allocate space for several records before the table is used. Therefore, when a new record needs to be added to the table, space already exists. This reduces the overhead for storing reservation data.

Operation Flow Diagrams

Figure 9:
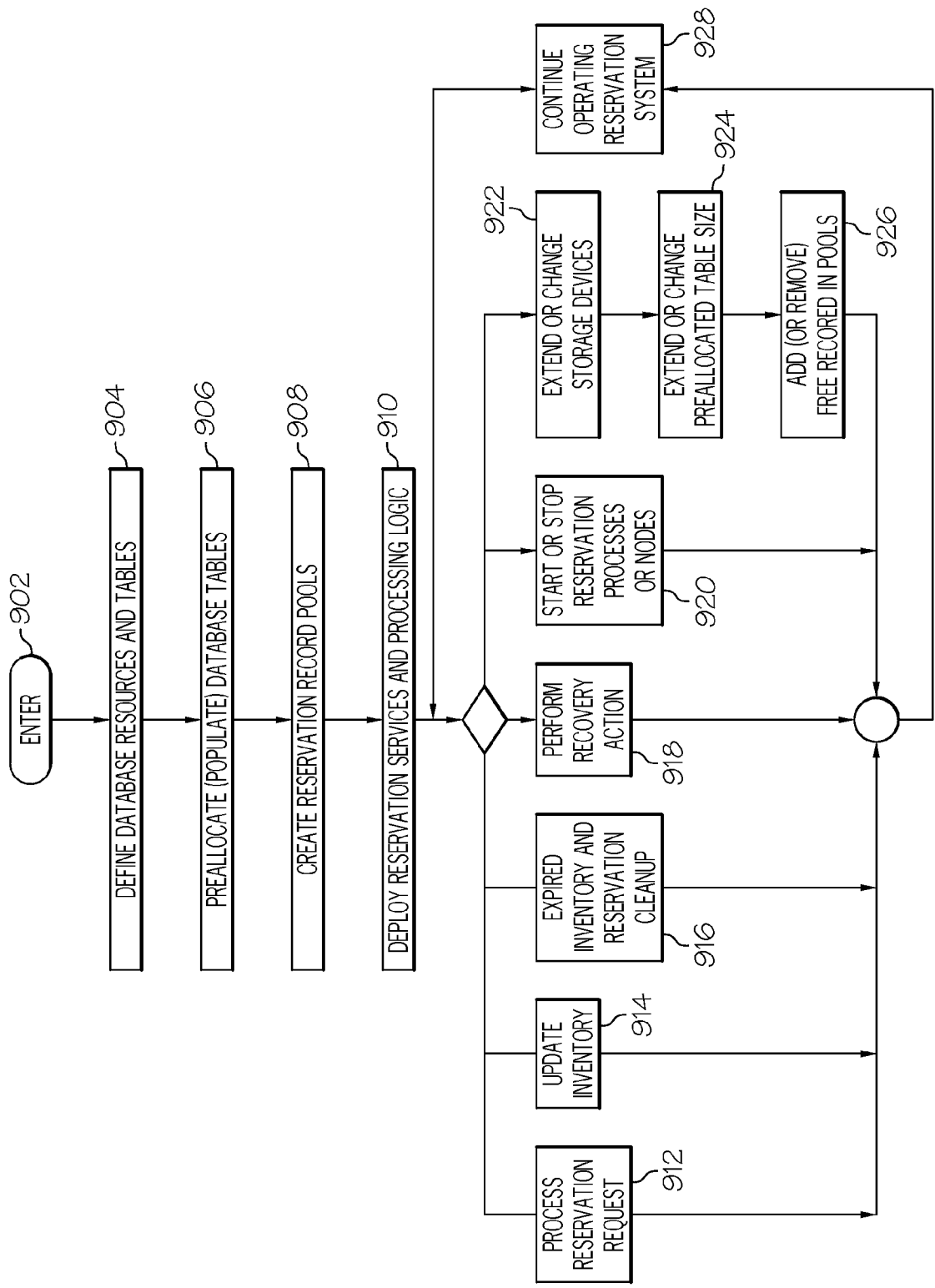
FIG. 9 is a flow chart showing use of an example of a method that operates a two layer reservation system, according to one embodiment of the present invention.

FIG. 9 is an operational flow diagram that illustrates one example of managing reservation operations in operating a two layer reservation system according to one embodiment of the present invention. The operational flow diagram of FIG. 9 begins at step 902 and flows directly to step 904. The database 214 in the lower layer 114, at step 904, is defined as well as the tables, which provide the persistent storage for the upper layer record pools. Initially the database tables are empty and do not contain any rows. The tables, at step 906, are pre-allocated with an appropriate number of rows of the expected storage size and initialized but do not contain any meaningful data. The upper layer record pools, at step 908, are established for the record pools of the reservation application and mapped to underlying database records, as shown in FIG. 8. The reservation services and reservation processing logic, at step 910, are deployed to a processing platform.

The paths through steps 912, 914, 916, 918, 920, 922, 924, 926 all represent basic "operations" that can occur during normal operation of the system. In a practical working reservation system many instances of each of these basic operation types could be in progress concurrently. Various embodiments of the present invention operate the reservation system continuously. Therefore, on completion of each instance of one of the basic operation types, the system goes back and starts the handling of any additional waiting operation requests. This is represented in FIG. 9 by the loopback path at step 928 showing that the reservation system continues to operate and pick up the next available or waiting request for an operation whenever it completes processing of an earlier operation.

In particular, a reservation request, at step 912, is processed. The flows in FIGS. 6 and 7 show the processing steps for one sample type of reservation request, namely a booking. Other types of reservation requests in an airline context can include retrievals, price an availability searches, reservation changes, cancellations updates for payment, checked luggage and boarding pass issue. Other reservation domains have analogous reservation request types.

The inventory, at step 914, is updated, which represents requested changes to the available inventory. This occurs when a particular collection of inventory is "made available for reservations". In an airline context flights may become available for booking up to a year before their scheduled flight date. Inventory may get removed when schedules are changed or a flight is cancelled or after corresponding events in other reservation domains. An operational action(s), at step 916, is performed to clean up reservations and inventory that have passed their expiry date. In an airline context, inventory expires and can be archived and removed some small number of days after the flight has flown. Similarly reservations expire and be archived and removed some small number of days after the last leg of the reservation has been flown or after the reservation has been cancelled. Analogous expiry processing occurs in other reservation domains.

A recovery action(s), at step 918, is performed that is prompted either by an explicit request to perform application aware resource recovery or implicitly in response to failure of a processing element in the reservation system such as a node, persistent storage device, processor or process. Application aware resource recovery was discussed above with respect to FIGS. 3, 4, and 6. For principal classes of processing element failure the following is a brief non-limiting summary. Disk failure is recovered in the lower general purpose database layer 114 using some dual write or RAID capability and copying data to a new device or possibly using log based recovery for the most recent updates. Node failure may require some lower level log based database recovery to assure consistent data on the persistent devices and database locks to be released. Processor and process failure may be detected by processing in the application aware processing as a managed timeout and handled with restart processing as discussed above with respect to FIGS. 3-4.

Step 920 shows the starting and stopping of reservation processes and nodes. This is typically done when the system is either overloaded (leading to start up of additional processes or nodes) or underutilized in which case processor nodes may be stopped. Finally, steps 922-926 illustrate what happens when new persistent storage devices are added to the system or possibly removed from the system. Step 922 represents the addition or removal of the new devices. In element 922 the lower level database responds to having these new devices available. New storage extents are made available to the persistent storage tables. These new areas are then initialized with new "pre-allocated" empty records of appropriate record length at step 924. Then in step 926 the record pools in the upper layer can be updated to reflect the availability of these new free pool records now available for use. In this way "pre-allocation" of records in persistent storage tables in the lower level general purpose database can actually occur while the system is operating as well as before it starts.

It should be noted that steps 922-926 have been discussed in terms of new persistent storage devices being made available. If a device has to be removed because the device has failed or is being replaced with larger or faster devices, care is taken to ensure that all data on that device representing active pool records is replicated or copied to other operational devices. This ensures that there is no loss of information available to application aware record processing in the upper layer of the system.

Figure 10:
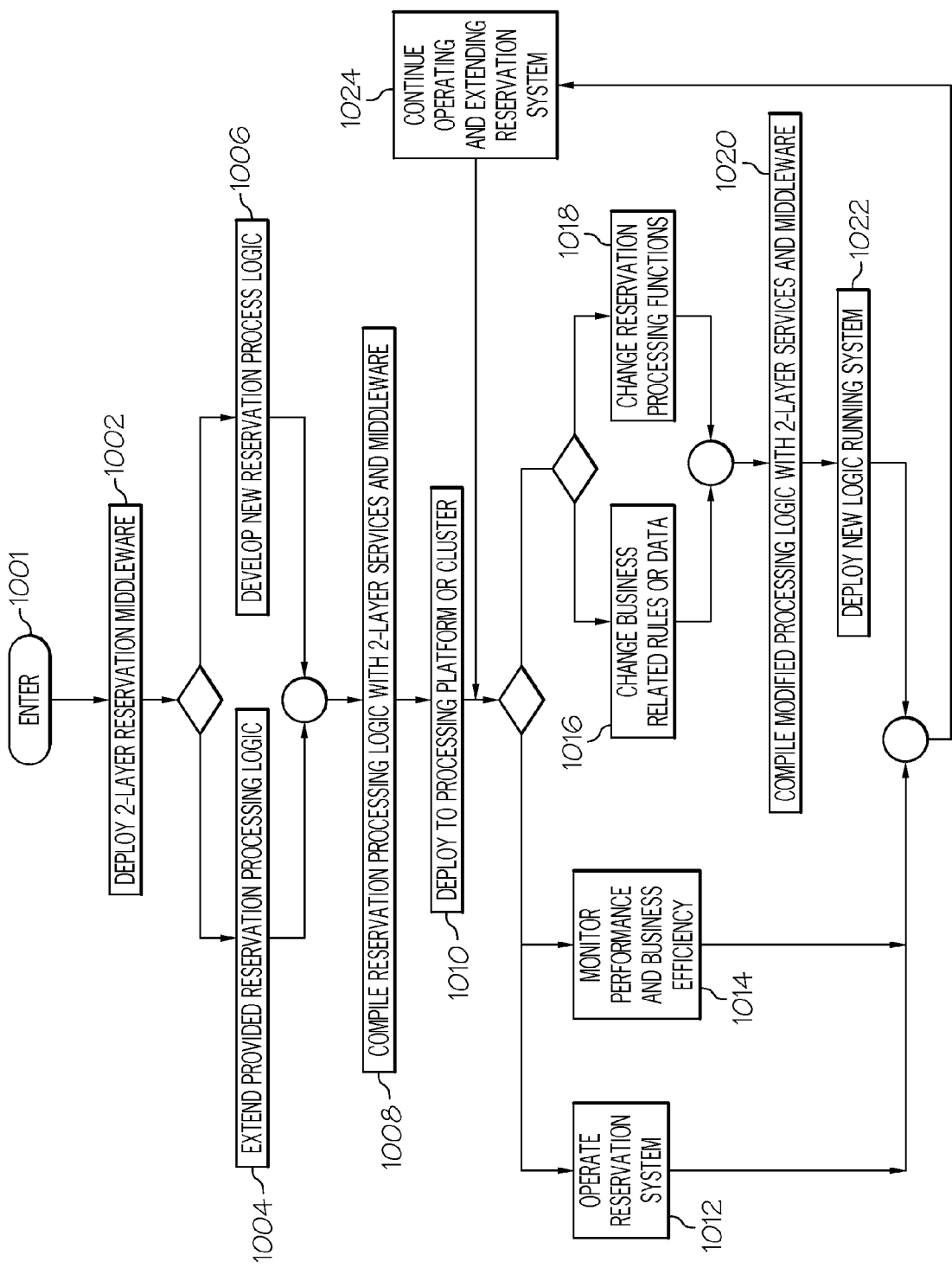
FIG. 10 is a flow chart showing use of the method and middleware based on the method to facilitate the development, deployment, operation, and extension of reservation systems.

FIG. 10 is an operational flow diagram that illustrates one example facilitating the development and deployment of reservation processing solutions according to one embodiment of the present invention. The operational flow diagram of FIG. 10 begins at step 1001 and flows directly to step 1002. A middleware embodying the two layers 112, 114 of the reservation management system 108, at step 1002, is deployed. This middleware might provide a sample of basic reservation application built using the middleware. One path for the reservation system owner to develop basic reservation processing logic addressing the needs of a particular reservation domain is to start with the example application and extend it is provided at step 1004. An alternate path is to develop new domain specific reservation logic using the middleware provided services at step 1006. The discussion above made with respect to FIGS. 3-4 introduced and explained domain specific reservation processing logic and the application aware reservation processing and transaction services.

The application processing logic, at step 1008, is to compiled and linked with the middleware run time and libraries producing an executable for the reservation system. This is then deployed to a processing platform or cluster at step 1010. At this point, operation of the working reservation system can begin. The paths shown at steps 1012 and 1014 and the complex flow through elements 1018-1022 all represent extended "operations" that can occur during normal operation of the system, monitoring of the system and enhancements of the processing logic deployed in the system. In a practical working reservation system many instances of each of these extended operation types could be in progress concurrently. Various embodiments of the present invention operate the reservation system continuously. Therefore, on completion of each instance of one of the extended operation types, the system goes back and starts the handling of any additional waiting operation requests. This is represented in FIG. by the loopback path through at step 1024 showing that the reservation system continues to operate and pick up the next available or waiting request for an extended operation whenever it completes processing of an earlier operation.

In particular, step 1012 corresponds to executing basic operations with the reservation system. These involve handling the actions discussed with respect to steps 912 to 926 of FIG. 9. Step 1014 shows adding monitoring of the reservation system performance and its business efficacy. This is something which the owner of the reservation system is likely to want to do in order to decide where improvements in function and processing logic of the system are required. By providing a scalable reservation system executing on a general purpose operating system with the data managed by a general purpose database, various embodiments facilitate this monitoring.

Finally the complex path through steps 1016-1022 represents the action of enhancing the business rules and reservation processing logic in the system. Alternative steps 1016 and 1018 represent different possible levels of change to the reservation processing logic. In step 1016, a business expert is able to make adjustments to business rules or choices of data to store in the system. Step 1018 represents changes in reservation processing capability which would typically require programming skill. In either case, the changed specification is recompiled with the two layer services and middleware runtime as shown in step 1020. The resulting executable can then be deployed into the running reservation system at step 1022. Typically this is done by starting a new node or process running this new executable as introduced in step 920 of FIG. 9.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a computer readable storage medium or a program product via CD or DVD, e.g. CD, CD-ROM, or other form of recordable media, and/or according to alternative embodiments via any type of electronic transmission mechanism.

What is claimed is:

1. A reservation management information processing system, comprising:
at least one processing node comprising a memory and a processor, wherein the at least one processing node further comprises a set of reservation processing and transaction modules that manage and process reservation requests and inquiries;
at least one general purpose database communicatively coupled to the at least one processing node, wherein the at least one general purpose database comprises a set of pre-allocated tables of fixed length records, wherein the set of pre-allocated tables are pre-populated with fixed length records prior to being populated with data, wherein the fixed length records are independently accessible by the set of reservation processing and transaction modules and are independently lockable by the general purpose database, wherein the general purpose database is configured to store reservation related information within one or more of the fixed length records based on receiving a record update operation from the set of reservation processing and transaction modules, and wherein the set of reservation processing and transaction modules are configured to track which of the fixed length records are being utilized to store reservation related information; and
at least one persistent storage device communicatively coupled to the at least one processing node, wherein the general purpose database persistently stores the set of pre-allocated tables of fixed length records on the at least one persistent storage device,
wherein the at least one processing node is configured to perform a method comprising
determining that at least one user is interacting with at least one reservation inventory resource stored in a first fixed length record of at least a first of the set of pre-allocated tables;
identifying at least a second fixed length record in at least a second of the set of pre-allocated tables that is available for use, wherein the second fixed length record is absent reservation related information; and
temporarily moving, via an update record transaction, the at least one reservation inventory resource from the first fixed length record to the second fixed length record for a given amount of time, wherein at least one of a set of reservation processing and transaction modules prevents the second fixed length record from being associated with another user.

2. The reservation management information processing system of claim 1, wherein the general purpose database is a relational database.

3. The reservation management information processing system of claim 1, wherein the set of pre-allocated tables of fixed length records comprises at least one pool of uniquely identified fixed size records.

4. The reservation management information processing system of claim 3, wherein the set of reservation processing and transaction modules comprises a record pool management module that manages the at least one pool of uniquely identified fixed size records, and wherein the record pool management module stores reservation related information on a fixed size record in the pool of uniquely identified fixed size records as an update to the fixed size record.

5. The reservation management information processing system of claim 1, wherein the set of reservation processing and transaction modules comprises an indexing and resource recovery module for:
creating a set of indexes associated with retrieving records in the set of pre-allocated tables of fixed length records.

6. The reservation management information processing system of claim 5, wherein the indexing and resource recovery module is further for:
periodically scanning a set of indexes;
detecting, in response to the scanning, a set of one or more lost resources and misplaced reservation resources; and
recovering the set of one or more lost resources and misplaced reservation resources.

7. The reservation management information processing system of claim 1, wherein the set of reservation processing and transaction modules comprises an application level locking and resource holding module for:
locking a set of reservation resources being used by a reservation application for a given period of time in a transitional state, wherein the set of reservation resources that are locked are recoverable.

8. The reservation management information processing system of claim 1, wherein the set of reservation processing and transaction modules comprises a timeout and restarting processing module for at least one of:
assigning a set of timeouts associated with the set of reservation processing and transaction modules and enforcing the set of timeouts; and
detecting that a failure has occurred in the set of reservation processing and transaction modules and restarting at least one of the set of reservation processing and transaction modules in response to detecting the failure, wherein restarting the at least one of the set of reservation processing and transaction modules is transparent to a user.

9. The reservation management information processing system of claim 1, wherein the method further comprises:
identifying at least a third fixed length record in at least one of the set of pre-allocated tables that is available for use; and
storing, via an update record transaction, a new reservation associated with the user in the third fixed length record based on at least the inventory resource that has been temporarily moved to the second fixed length record.

10. A computer implemented method for continuously and persistently managing a reservation system, the computer implemented method comprising:
pre-allocating, by a processor using a general purpose database, a set of tables of fixed length records, wherein the set of tables are pre-populated with fixed length records prior to being populated with data, wherein the fixed length records are configured to store reservation related information based on record update operations, and wherein the fixed length records are independently accessible by a reservation processing module and are independently lockable by the general purpose database, wherein the reservation processing module is independent from the general purpose database;
designating, by a processor, at least a first table in the set of pre-allocated tables to store user reservation dialog state information;
designating, by a processor, at least a second table in the set of pre-allocated tables to store inventory information;
tracking, by the reservation processing module, which of the fixed length records are currently being utilized to store reservation related information;
receiving, by a processor using the reservation processing module, a request for a reservation from a user;
identifying, based on the receiving and the tracking, at least one fixed length record in the first table that is available for use, wherein the first fixed length record is absent reservation related information;
storing, by a processor using the reservation processing module, a set of information associated with a user reservation dialog state in the at least one fixed length record that has been identified in the first table as an update to the first table, wherein the storing at least comprises temporarily storing, via an update record transaction, at least one reservation inventory resource from a fixed length record of the second table in the at least one fixed length record that has been identified for a given amount of time; and
managing, by a processor using the reservation processing module, the request from the user based on a set of reservation state information within the set of tables comprising at least inventory information in the second table.

11. The computer implemented method of claim 10, wherein the general purpose database is a relational database.

12. The computer implemented method of claim 10, wherein the set of tables is a set of range clustered tables.

13. The computer implemented method of claim 10, wherein managing the request further comprises:
determining that the request has failed to be satisfied within a given amount of time; and
discarding the request and releasing any reservation resources allocated to the request.

14. The computer implemented method of claim 10, wherein the managing further comprises:
    storing a set of reservation related information associated with the request in one or more tables in the set of pre-allocated tables as updates to the one or more tables; and
    persistently storing the set of reservation related information stored in the one or more tables on at least one persistent storage devices at one or more given intervals of time.

15. The computer implemented method of claim 10, wherein the inventory information is associated with at least one of accommodations, transportation, and entertainment events.

16. A computer implemented method for continuously and persistently managing a reservation system, the computer implemented method comprising:
    pre-allocating, by a processor using a general purpose database, a set of tables of uniquely identified fixed size records, wherein the set of tables are pre-populated with uniquely identified fixed size records prior to being populated with data wherein the uniquely identified fixed size records are configured to store reservation related information based on record update operations, and wherein the uniquely identified fixed size records are independently accessible by a reservation processing module and are independently lockable by the general purpose database, wherein the reservation processing module is independent from the general purpose database;
    managing, by a processor using the reservation processing module, the uniquely identified fixed size records, wherein the managing comprises at least tracking which of the uniquely identified fixed size records are currently being utilized to store reservation related information;
    receiving, by a processor using the reservation processing module, a request from a user for a reservation;
    identifying, based on the receiving, at least one uniquely identified fixed size record in a first of the set of tables that is available for use, wherein the uniquely identified fixed size record is absent reservation related information;
    updating via an update record transaction, by a processor using the reservation processing module, the at least one uniquely identified fixed size record that has been identified with a set of user reservation dialog information, wherein the set of user reservation dialog information comprises at least user identification information and a set of inventory resources from one or more uniquely identified fixed size records in a second of the set of tables, wherein the set of user reservation dialog information is temporarily stored within the at least one record that has been identified for a given amount of time;
    persistently storing, based on the updating, the at least one uniquely identified fixed size record that has been identified on at least one persistent storage device at one or more given intervals of time;
    updating via an update record transaction, by a processor using the reservation processing module, the one or more uniquely identified fixed size records in the second of the set of tables based on updating the at least one uniquely identified fixed size record in the first of the set of tables; and
    persistently storing the one or more uniquely identified fixed size records from the second of the set of tables on at least one persistent storage device, at one or more given intervals of time.

17. The computer implemented method of claim 16, wherein the managing the uniquely identified fixed size records further comprises:
    determining that each uniquely identified fixed size record in the one or more sets is one of active, inactive, allocated, and not allocated.

18. The computer implemented method of claim 16, further comprising at least one of:
    binding a recovery time of the general purpose database, after a failure thereof, to a given amount of time; and
    binding a set of operations that generate a reservation based on the request received from a user, after a failure of at least one operation in the set of operations, to a given amount of time.

19. The computer implemented method of claim 16, wherein the general database is a transactional relational database that utilizes log-based recovery.

20. The computer implemented method of claim 16, wherein the general purpose database is updated by updating the uniquely identified fixed size records.

21. The computer implemented method of claim 16, wherein at least one set of the uniquely identified fixed size records comprises a plurality of inventory resources.

22. The computer implemented method of claim 21, further comprising:
    analyzing the plurality of inventory resources;
    determining that at least one resource in the plurality of inventory resources has been lost; and
    restoring the at least one resource that has been lost as an available resource in the plurality of inventory resources.

23. The computer implemented method of claim 21, further comprising:
    performing a recovery of at least one resource in the plurality of resources, wherein the performing is based on:
        generating an index based on the plurality of inventory resources that identifies a set of reservations to which each inventory resource in the plurality of inventory resources has been allocated.

24. The computer implemented method of claim 21, further comprising:
    performing a recovery of at least one resource in the plurality of resources, wherein the performing is based on:
        scanning a set of current reservation sessions; and
        identifying that the inventory resource has been idle more than a given amount of time.

* * * * *